Figure 1:
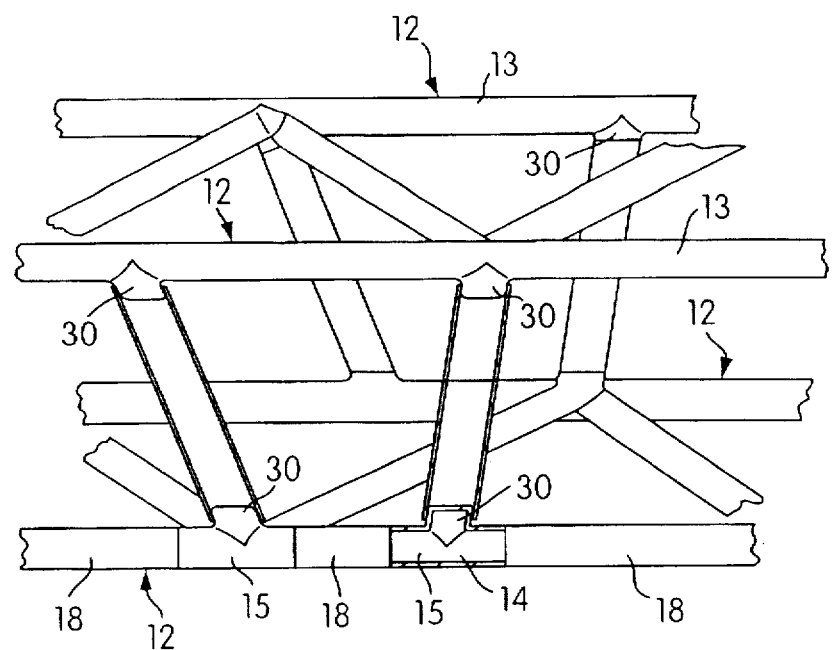

United States Patent [19]

Kaehler et al.

[11] Patent Number: 5,794,398
[45] Date of Patent: Aug. 18, 1998

[54] FRAMEWORK WITH HOLLOW MEMBERS PROCESS FOR PRODUCING THE SAME AND ITS USE

[76] Inventors: Klaus Kaehler, Mahrenstr. 7; Friedrich Klaas, Achalmstr. 24; Helmut Bogel, Gabelsbergerstr. 10, all of D-73431 Aalen, Germany

[21] Appl. No.: 835,232

[22] Filed: Apr. 7, 1997

Related U.S. Application Data

[63] Continuation of Ser. No. 387,927, filed as PCT/DE93/00725 Aug. 12, 1993 published as WO94/04766 Mar. 3, 1995.

[30] Foreign Application Priority Data

Aug. 25, 1992 [DE] Germany ............... 42 28 238.1

[51] Int. Cl.$^6$ ............................................. F16B 7/00
[52] U.S. Cl. ............. 52/653.2; 52/655.1; 52/690; 296/205; 296/29; 29/897.2; 29/897.31; 29/421.1; 29/522.1; 29/523; 403/169; 403/171; 403/271
[58] Field of Search ............... 52/653.1, 655.1, 52/655.2, 634, 636, 649.6, 649.7, 646, 690, 693; 403/169, 171, 174, 271; 296/29, 203, 205; 29/897.2, 897.31, 421.1, 522.1, 523, 505

[56] References Cited

U.S. PATENT DOCUMENTS

| 2,149,844 | 3/1939 | George ................. 403/169 X |
| 2,491,379 | 12/1949 | Kraeft et al. ............. 403/169 |
| 2,995,781 | 8/1961 | Sipler . |
| 4,051,704 | 10/1977 | Kimura . |
| 4,437,288 | 3/1984 | Foissac et al. ........... 403/171 X |
| 4,543,008 | 9/1985 | Salama et al. ............ 52/693 X |
| 4,557,097 | 12/1985 | Mikulas, Jr. et al. ...... 403/171 |
| 4,660,345 | 4/1987 | Browning . |
| 4,705,266 | 11/1987 | Lauzier . |
| 4,829,739 | 5/1989 | Coppa .................. 52/693 X |
| 4,840,053 | 6/1989 | Nakamura ............ 29/421.1 X |
| 4,928,509 | 5/1990 | Nakamura ............ 29/421.1 X |
| 4,930,930 | 6/1990 | Coppa .................. 52/693 X |
| 4,964,749 | 10/1990 | Saari .................. 403/271 X |
| 5,435,110 | 7/1995 | Stol et al. ............. 403/171 X |

FOREIGN PATENT DOCUMENTS

| 0 078 551 | 4/1982 | European Pat. Off. . |
| 0 491 363 A1 | 12/1991 | European Pat. Off. . |
| 1154610 | 7/1956 | France . |
| 1154610 | 11/1957 | France . |
| 2018802 | 4/1970 | Germany . |
| 2095147 | 9/1982 | United Kingdom . |
| WO8701978 | 4/1987 | WIPO . |

OTHER PUBLICATIONS

Lange, Kurt, "Concerning The Application Of A Hydraulic Bulge Process", Industrie–Anzeiger, Tool Machine Fabrication Technology, May 10, 1966, pp. 107–110.

F. Klaas, "Application Aspects In Internal High Pressure Forming", Werkstattstechnik, 1989, pp. 210–214.

*Primary Examiner*—Robert Canfield
*Attorney, Agent, or Firm*—Cushman Darby & Cushman IP Group of Pillsbury Madison & Sutro

[57] ABSTRACT

A framework, in particular an at least partially hollow framework, has nodes and members. The nodes are formed by at least a projection on a hollow framework member and by at least a further hollow member mounted and secured thereon. Also disclosed is a process for producing this framework and its use in land, air and water vehicles, in building construction, in civil and underground engineering, scaffolds, shelving systems and furniture.

10 Claims, 3 Drawing Sheets

FRAMEWORK WITH HOLLOW MEMBERS PROCESS FOR PRODUCING THE SAME AND ITS USE

This is a continuation of Ser. No. 387,927, filed as PCT/DE93/00725 Aug. 12, 1993 published as WO94/04766 Mar. 3, 1995.

The invention relates to frameworks with hollow members of nodes and bars, a process for producing them and their use.

Frameworks are known as supporting and bearing elements in the most varied fields—for instance for structures, in particular bridges or even houses—or also for the construction of air, land and marine vehicles, shelf systems and the like.

They have the advantage, among other things, of making possible light construction which nevertheless is resistant to stresses.

Tube frames were already employed in automobiles, in particular the old "gull-wing Mercedes SL" to make possible a particularly light, sturdy and torsion-proof construction. The framework construction was also often employed in aircraft, where weight savings are an essential aspect in construction.

The known frameworks lent themselves to further improvement in that weak points could occur in the nodes of the framework in the course of attachment of the framework components. The individual elements were usually fastened there, for example welded, on top of or flush with each other. Corrosions did easily appear at the weld seams, glued spots or the like, as well as at the ends of the hollow elements to be connected—the application of corrosion protection there was extremely difficult and often not satisfactory.

These weld spots or fastening places of cross members on the longitudinal element were always points of weakness and also resulted in elaborate operations being necessary during manufacture.

It was furthermore disadvantageous that, for reasons of the need to fasten further transverse hollow elements on the longitudinal hollow element, it was necessary to employ relatively large wall thicknesses in the hollow elements for producing a satisfactory connection, which led to undesirably great weight of this part.

In contrast thereto it is the object of the invention to produce frameworks as well as individual components for them which are easier to manipulate and are more corrosion-resistant than the known individual components.

This object is attained in accordance with the invention in connection with a framework, in particularly an at least partially hollow framework with nodes and rods, by nodes formed by at least one projection on the hollow framework element and at least one further hollow element placed thereon and fastened.

In this connection it is advantageous if the run of the fibers extends essentially parallel with the exterior contours of the hollow element.

It can be of advantage if at least the framework elements having nodes have several layers of the same or different materials which extend parallel to each other and are placed on top of each other and the run of whose fibers is parallel in respect to each other.

In connection with a preferred embodiment at least the node/rod elements are made of steel, having a wall thickness between 0.1 to 1.5 cm, preferably between 0.2 and 0.5 cm.

For saving weight in particular, the framework can essentially be made of a light metal.

For example, the light metal can be aluminum or an alloy thereof, which can also include advantageous corrosion resistance.

It is possible, and desired in many applications, for the framework to have reinforced-fiber materials which have a high mechanical load-bearing capacity along with light weight.

The framework of nodes and rods has different longitudinal sections and also different cross sections.

It can be advantageous for the individual components of the framework to consist of different materials.

It can be favorable for at least one hollow element to have depressions and/or openings formed therein.

An advantageous process for producing frameworks in accordance with one of the preceding claims consists in that the framework nodes are produced from a shapable hollow material by means of a shaping process.

The shaping process preferably is an internal high-pressure shaping process.

A preferred embodiment of the production process for a framework node element has the following steps:

Provision of a hollow profiled section, if required with different diameters;

Placement of a hollow profiled section into a mold with a widening in the shaping area;

Application of internal high pressure to the tube, so that the tube wall is widened in the area of the mold widening;

Removal of the shaped hollow element with a node area with widenings and, if necessary, Fastening of framework elements on the widenings.

The internal high-pressure process, also called IHV-process, is understood here to be the process as described, for example, in the Industrieanzeiger [Industrial Gazette] No. 20 of Mar. 9, 1984, or also in "Metallumformtechnik" [Metal Shaping Technology], volume 1D/91, pp. 16 et. seq.: A. Ebbinghaus: Präzisionswerkstücke in Leichtbauweise, hergestellt durch Innenhochdruckumformen" [Precision Workpieces of Light Construction, Produced by Internal High-Pressure Shaping], or in Werkstoff und Betrieb [Materials and Factory] 123 (1990), 3, page 241 to 243: A. Ebbinghaus: "Wirtschaftliches Konstruieren mit innenhochdruckgeformten Präzisionswerkstücken" [Economical Construction with Precision Workpieces Made by Internal High-Pressure Shaping], or Werkstoff und Betrieb 122, (1991), 11, (1989), page 933 to 938. Full reference is made below to their disclosures to avoid repetitions. This method had been used up to now for producing flanges, for example to produce manufactured camshafts for fastening cams on a tube for producing hollow camshafts.

In a surprising manner it is now possible by means of this internal high-pressure process to form a completely novel framework piece in which the node or the "intersection" has already been formed in one piece and the run of the fibers in the area of the intersection as well of the walls essentially extends parallel with the outer contour without there being sharp bends or other weak spots. Thus, because of the great wall strength caused by the advantageous run of the fibers, the framework in accordance with the invention can be embodied in a lighter form than was possible up to now and therefore makes possible considerable weight savings. It is also possible to employ laminated materials as long as they can be shaped together. Through proper material selection, laminates can be lighter than solid materials and have the additional advantage of acting in a vibration-damping manner, so that such an element additionally has advantageous oscillation damping properties—i.e. connecting points are less stressed by oscillations.

It is also possible to select a multi-layered metal tube as the initial part, depending on the requirements made on the material. In this case multi-layered embodiments have the advantage of having different capacities of the surfaces of the hollow element to withstand stress, and also the advantage of transmitting oscillations of every type less, which decisively improves the vibration behavior of the hollow element.

Advantageous uses for the frameworks in accordance with the invention occur in connection with land, air and marine vehicles, frames for bicycles, motorcycles and automobiles, structural and civil engineering, scaffolding, shelf systems, furniture.

Because in accordance with the invention hollow elements which are closed-off to a large extent are used for producing the framework, it is possible to allow the simplest connection of further framework elements in the areas of the nodes of the framework. The connection in the area where one projection of a hollow element overlaps the end section of a further hollow element of the framework can be made by welding, gluing, riveting, screwing as well as other fastening methods known to one skilled in the art, wherein it is also possible to make releasable connections, such as are desired for scaffolding, by running screws through, or the like.

Because an internal high-pressure shaping process is employed it is possible to produce projections and recesses, openings and the like already in one shaping process. In this way it is possible to reduce finishing steps.

The most varied hollow profiled sections, such as square profiled sections, angled profiled sections, tubes, etc. can be employed as hollow elements.

In this way an element is produced which has a reduced weight in respect to conventional elements with the same load-bearing capacity, or even higher load-bearing capacity at the same weight; which in addition can be produced with a high production accuracy and with a reduced rejection rate.

The hollow element of the invention can preferably be produced in accordance with the internal high-pressure process.

In a surprising manner it is now possible by means of this internal high-pressure process to form a completely novel framework piece in which the node has already been formed in one piece and the run of the fibers in the area of the intersection as well of the walls essentially extends parallel with the outer contour without there being sharp bends or other weak spots. Thus, because of the great wall strength caused by the advantageous run of the fibers, the framework in accordance with the invention can be embodied in a lighter form than was possible up to now and therefore makes possible considerable weight savings. It is also possible to employ laminated materials as long as they can be shaped together. Laminates have the additional advantage of acting in a vibration-damping manner, so that such an element also has advantageous oscillation damping properties.

The production of the hollow element in accordance with the invention takes place as follows: A tube element with different diameters is produced (for example by circular kneading), wherein the node area is subsequently pressed against an external mold under internal pressure to obtain a cross-shaped element with two closed ends.

In the course of shaping it is desirable to feed material in the direction of the longitudinal tube axis to prevent the creation of thin spots in the material in the area of the intersection.

Figure 2:
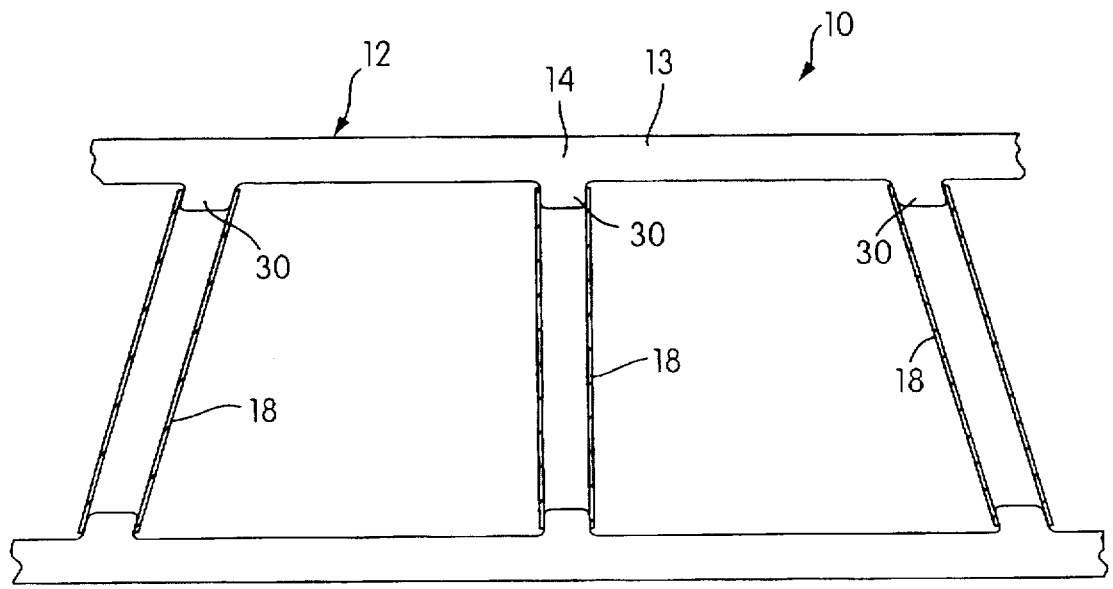
Figure 3:
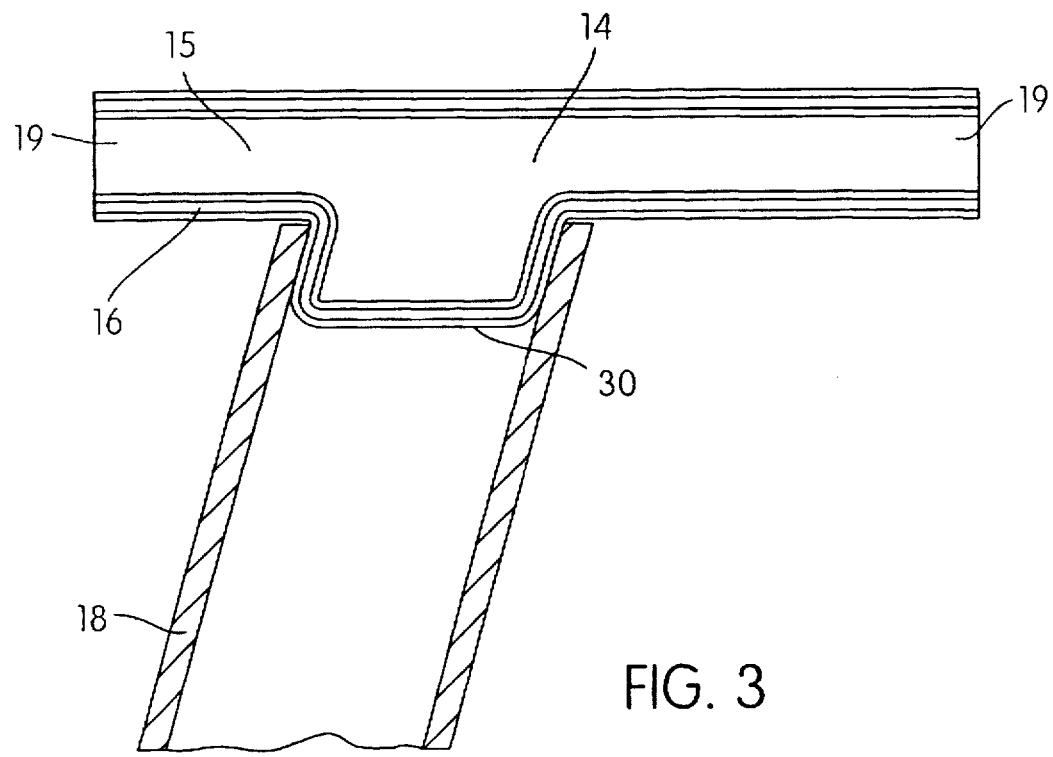
Figure 4:
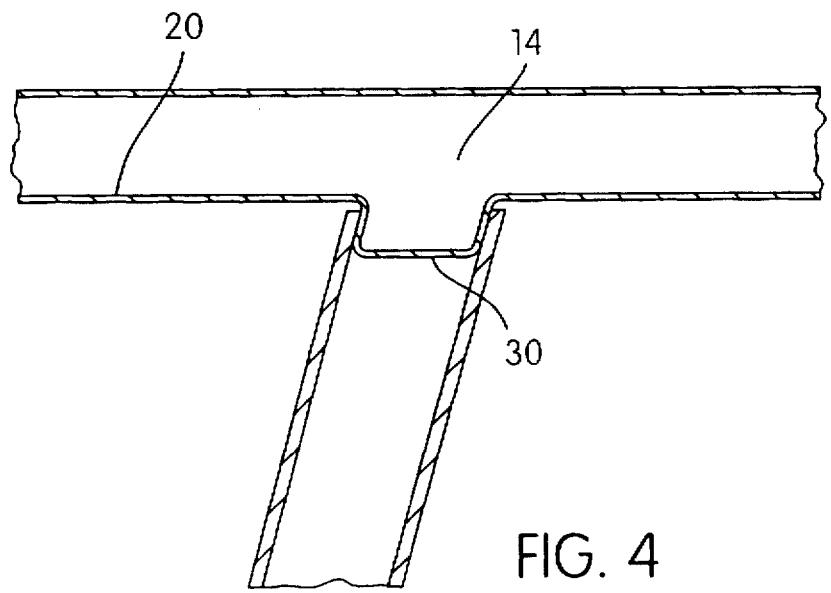
Figure 5:
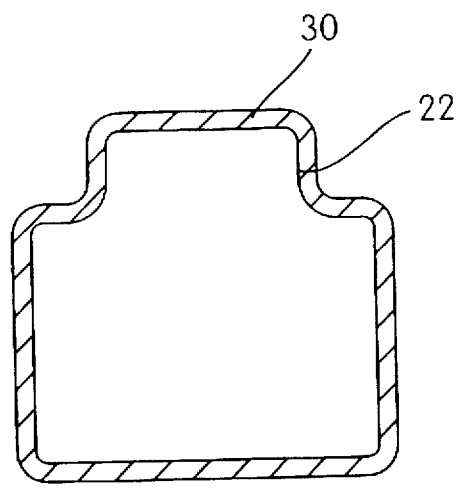
Figure 6:
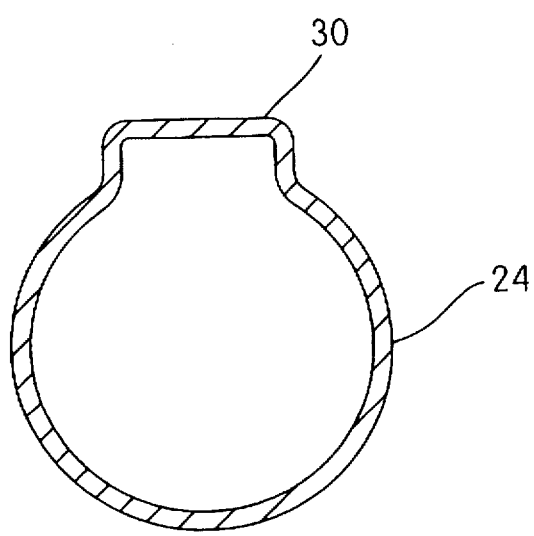
Figure 7:
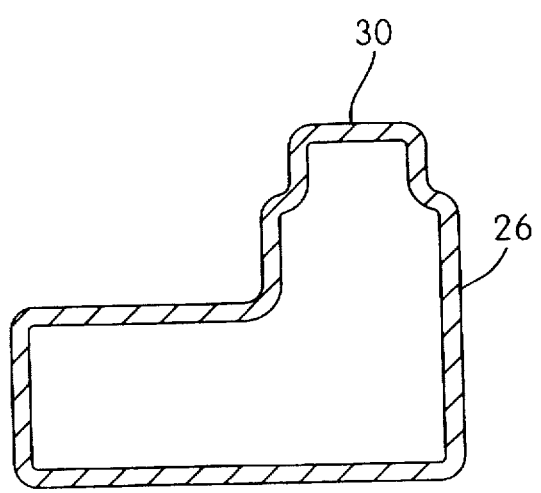

The invention will be described in detail below by means of the attached drawings, in FIG. 1 a schematic perspective view of a section of a framework;

FIG. 2 a longitudinal section of the hollow framework made of solid material with several node areas;

FIG. 3 a longitudinal sectional view of a portion of the framework including a node/rod part having a projection shown connected with one end of a rod part;

FIG. 4 a detailed view of a node area of solid material shaped by internal high pressure;

FIG. 5 a cross section through a node area of a hollow element with a square profile;

FIG. 6 a cross section through the node area of a round tube as the hollow element; and FIG. 7 a cross section through the node area of a polygonal tube.

As can be seen in FIG. 1, which shows a section of a framework in accordance with the invention, the framework consists of node/rod parts 12, and rod parts 18. The node/rod parts 12 can be formed as an integrally formed elongated member 13 with a plurality of laterally extending projections 30, or as a plurality of truncated members 15 each having only a single projection 30 and interconnected end to end by rod parts 18. Projections 30 have been formed on the node-rod parts 12 in the areas of intersection or node areas 14. The rod parts 18 and also node/rod parts 12 can be placed and connected releasably or solidly with the projection 30.

As shown in FIG. 2, the nodes can extend spatially depending on the requirements, so that a three-dimensional framework of high solidity can be attained.

Care must be taken that predetermined compression places can be formed by directly cut-in grooves in the framework elements produced by the shaping process—for example for absorbing energy by directed deformation in vehicles in case of an accident—or that profiled reinforcement sections can be worked in—for example by forming linear ribs (passenger compartment).

In the process, the hollow profiled sections of the framework can have varying diameters over their linear extension, as well as varying cross sections.

The embodiment of a node area 14 is shown in detail in longitudinal section in FIG. 3. In this case an embodiment was selected wherein a truncated node/rod element 15 made of several layers 16 was combined with a rod element made of one material—for example this can be a portion of a ladder-like element with laminated longitudinal stringers and steps of another material. It can be appreciated that the node/rod member or element 15 has two opened ends 19 and a laterally projecting portion 30 between the ends 19. It can also be seen that the end of projection 30 is devoid of any opening.

FIG. 4 shows an embodiment of the connection between the node/rod element 12 and the rod element 18 in section, wherein both elements are made of a single-layer material.

In both cases the fastening of the rod parts 18 or even further node/rod parts 12 on the node/rod part 12 is only schematically represented and can take place in actuality by gluing, welding or also screwing, riveting or the like.

Varied shapes can be employed as hollow profiled sections, as can be seen from FIGS. 5 to 7.

Depending on the form of application it can useful to provide a rectangular profiled section 22 with a projection 30.

In the same way it is possible to embody a round or oval profiled section 24 with a projection 30 for connecting it with a rod element, as can be seen from FIG. 6. As shown in FIG. 7, such projections can also be embodied on rectangular hollow profiled sections 26 for simplifying the fastening of rods on nodes.

In the process the hollow profiled sections can be made of a single material, for example steel or a light metal alloy, however, depending on the method of use it is also possible to shape laminated material, also plastic-layered or coated tubes, depending on the purpose of use.

By providing appropriate layers it is possible to achieve corrosion resistance or coloration without the necessity for further operational steps.

As known, the node area can be "pushed", so to speak, out of the hollow element precursor by means of the internal high-pressure process, so that several projections 30 are created in the hollow element, as shown in the figures. By feeding material along the longitudinal tube axis during shaping, for example by movable mold elements, it is possible to attain an essentially uniform wall thickness, so that weak spots in the wall thickness because of the formation of such projections can be compensated at least partially, so that the forming of the intersection area takes place without weakening. This element is light and has no welded places or the like in the intersection area because of the advantageous run of the fibers.

In this way a more resistant, lighter framework than was possible up to now is created by means of the embodiment, in particular of the node areas of a framework, in accordance with the invention.

Further embodiments and developments are obvious to one skilled in the art within the framework of the scope of protection of the claims, and the scope of protection is in no way limited to the embodiments shown here by way of example, which are merely intended for explanation.

We claim:

1. A framework comprising:

a plurality of generally tubular frame members each having two opened ends and at least one radially outwardly projecting portion disposed between said opened ends, each said at least one radially outwardly projecting portion being devoid of any openings and projecting radially outwardly beyond a general radial extent of said opened ends; and a plurality of interconnecting members interconnecting said plurality of generally tubular frame members to one another, said interconnecting members each having at least two openings, said tubular frame members having said projecting portions thereof fixedly retained within associated openings in said interconnecting members.

2. A framework according to claim 1, wherein said plurality of generally tubular members are further connected to one another by a connection which connects respective opened ends of respective pairs of said tubular frame members.

3. A framework in accordance with claim 1, wherein at least the generally tubular frame members have several layers of the same or different materials which extend parallel to each other and are placed on top of each other, and wherein fibers contained in said materials run parallel in respect to each other.

4. A framework in accordance with claim 1, wherein the materials are cold-formed.

5. A framework in accordance with claim 1, wherein said generally tubular frame members are made of steel and have a wall thickness between 0.1 to 1.5 cm.

6. A framework in accordance with claim 1, wherein said generally tubular frame members are essentially made of aluminum or an alloy thereof, or magnesium or an alloy thereof.

7. A framework in accordance with claim 1, wherein said generally tubular frame members are formed from reinforced fiber materials.

8. A framework in accordance with claim 1, wherein said generally tubular frame members have varied longitudinal sections.

9. A method of forming framework for a motor vehicle comprising:

(a) forming a plurality of generally tubular frame members each having two opened ends and at least one radially outwardly projecting portion disposed between said opened ends, said at least one radially outwardly projecting portion being devoid of any openings, said generally tubular members being formed by:

placing a generally tubular blank having two opened ends into a die mold cavity;

providing pressurized fluid internally to said generally tubular blank so as to radially outwardly expand said generally tubular blank at least at one portion thereof to form said at least one radially outwardly projecting portion extending radially outwardly beyond a general radial extent of said opened ends of the resulting generally tubular frame member;

removing the resulting generally tubular frame member from said die mold cavity;

(b) providing a plurality of interconnecting members each having at least two openings constructed and arranged to receive an associated one of said projecting portions; and (c) interconnecting said plurality of generally tubular frame members to one another by inserting said projecting portions of said tubular frame members into said openings of said interconnecting members and securing said projecting portions in retained relation within said openings.

10. A method according to claim 9, further interconnecting said generally tubular frame members by providing a connection which connects respective opened ends of respective pairs of said tubular frame members.

* * * * *